United States Patent [19]
Hayami et al.

[11] Patent Number: 5,938,219
[45] Date of Patent: Aug. 17, 1999

[54] INDEPENDENT STEERING SUSPENSION HAVING HIGH LONGITUDINAL COMPLIANCE WITH HIGH CASTER ANGLE STABILITY

[75] Inventors: Hiroshi Hayami; Masato Yamashita, both of Toyota, Japan

[73] Assignee: Toyota Jidasha Kabushiki Kaisha, Toyota, Japan

[21] Appl. No.: 08/884,473

[22] Filed: Jun. 27, 1997

[30] Foreign Application Priority Data

Aug. 9, 1996 [JP] Japan .................................... 8-227877

[51] Int. Cl.$^6$ ................................ B60G 3/20; B62D 7/18
[52] U.S. Cl. ............................ 280/124.135; 280/124.145; 280/124.148; 280/93.512
[58] Field of Search ..................... 280/124.135, 124.136, 280/124.138, 124.142, 124.143, 124.145, 124.146, 124.148, 93.512, FOR 117, FOR 118, FOR 124, FOR 126, FOR 148, FOR 153

[56] References Cited

U.S. PATENT DOCUMENTS

| 4,802,688 | 2/1989 | Murakami et al. | ............. | 280/124.138 |
| 5,348,337 | 9/1994 | Ando | ................................ | 280/124.135 |

FOREIGN PATENT DOCUMENTS

| 63-22711 | 1/1988 | Japan . | | |
| 63-57307 | 3/1988 | Japan . | | |
| 1-212603 | 8/1989 | Japan | ............................ | 280/FOR 124 |
| 2-38109 | 2/1990 | Japan | ............................ | 280/FOR 126 |
| 5-124535 | 5/1993 | Japan | ............................ | 280/FOR 124 |
| 5-178041 | 7/1993 | Japan . | | |
| 6-211014 | 8/1994 | Japan | ............................ | 280/FOR 117 |

*Primary Examiner*—Peter C. English
*Attorney, Agent, or Firm*—Oliff & Berridge, PLC

[57] ABSTRACT

An independent steering suspension for a steering vehicle wheel, including: a carrier for supporting the steering vehicle wheel; a knuckle for supporting the carrier to be angularly movable relative thereto about a steering axis; upper and lower arms mounted laterally between upper and lower portions of the knuckle and opposing portions of the vehicle body, respectively, the upper and lower arms each having a general plan configuration selected from alphabetic letters A, L, T and Y to have a broad end corresponding to the bottom of A or L or the top of T or Y and a narrow end corresponding to the top of A or L or the bottom of T or Y and being pivotably connected with the knuckle upper or lower portion at the broad end and with the vehicle body at the narrow end; a steering device mounted between the carrier and the vehicle body to variably determine an angular position of the carrier about the steering axis; and a damper and spring mounted between the knuckle and the vehicle body.

9 Claims, 2 Drawing Sheets

INDEPENDENT STEERING SUSPENSION HAVING HIGH LONGITUDINAL COMPLIANCE WITH HIGH CASTER ANGLE STABILITY

BACKGROUND OF THE INVENTION

1. Field of the Invention

The present invention relates generally to a suspension of a vehicle such as an automobile, and more particularly, to an independent steering suspension for a steering vehicle wheel.

2. Description of the Prior Art

As an independent steering suspension for a steering vehicle wheel, there has been proposed in Japanese Patent Laid-open Publication 6-211014 such a construction that a carrier for supporting the steering vehicle wheel to be rotatable about its rotation axis is supported by a knuckle to be angularly movable about a steering axis extending substantially vertically, and the knuckle is supported by an upper arm assembly and a lower arm from the vehicle body, wherein the upper arm assembly is mounted between an upper portion of the knuckle and an opposing portion of the vehicle body to include a first vertical arm member closer to the knuckle and a second horizontal arm member closer to the vehicle body and extending substantially in the lateral orientation of the vehicle body, while the lower arm is mounted between a lower portion of the knuckle and an opposing portion of the vehicle body to extend substantially in the lateral orientation of the vehicle body, the upper arm second member having a general plan configuration of the alphabetic letter A to have a broad end corresponding to the bottom of A and a narrow end corresponding to the top of A, the lower arm having a general plan configuration of the alphabetic letter Y to have a broad end corresponding to the top of Y and a narrow end corresponding to the bottom of Y, the upper arm second member being pivotably connected with the upper arm first member at the narrow end and with the opposing vehicle body portion at the broad end, the lower arm being pivotably connected with the knuckle lower portion at the broad end and with the vehicle body at the narrow end, with a strut bar being pivotably mounted between the knuckle and an opposing portion of the vehicle body to extend substantially in the longitudinal direction of the vehicle. A steering means is mounted between the carrier and the vehicle body to variably determine an angular position of the carrier about the steering axis relative to the vehicle body, and a vertical load reaction means including a spring and a damper is mounted between the knuckle and the vehicle body to extend substantially vertically.

In the above-mentioned prior art construction, when the compliance of the suspension in the longitudinal orientation of the vehicle, desired for attenuating a shock caused by the vehicle wheel running on a convex irregularity of the road surface, is increased, the caster angle will be substantially decreased when the vehicle wheel is braked, deteriorating the caster angle stability of the suspension.

SUMMARY OF THE INVENTION

In view of the above, it is a primary object of the present invention to provide an independent steering suspension for a steering vehicle wheel which can provide the longitudinal compliance at any desired degree based upon a design of overall performance of the suspension, without deteriorating the caster angle stability thereby.

It is another object of the present invention to provide an independent steering suspension having such an improved caster angle stability in a compact construction of the suspension.

According to the present invention, the above-mentioned primary objects are accomplished by an independent steering suspension for a steering vehicle wheel of a vehicle having a vehicle body and vehicle wheels including the steering vehicle wheel, the vehicle body having a longitudinal orientation thereof in a direction of running thereof and a lateral orientation thereof perpendicular to the longitudinal orientation as viewed from the top of the vehicle, comprising:

a carrier for supporting the steering vehicle wheel to be rotatable about a rotation axis thereof;

a knuckle for supporting the carrier to be angularly movable relative thereto about a steering axis extending substantially vertically;

an upper arm mounted between an upper portion of the knuckle and an opposing first portion of the vehicle body to extend substantially in the lateral orientation of the vehicle body, the upper arm having a general plan configuration selected from alphabetic letters A, L, T and Y to have a broad end corresponding to the bottom of A or L or the top of T or Y and a narrow end corresponding to the top of A or L or the bottom of T or Y, the upper arm being pivotably connected with the knuckle upper portion at the broad end thereof via pivot means including bearing portions provided at opposite edges of the broad end, and with the first vehicle body portion at the narrow end thereof via flexible bush means;

a lower arm mounted between a lower portion of the knuckle and an opposing second portion of the vehicle body to extend substantially in the lateral orientation of the vehicle body, the lower arm having a general plan configuration selected from alphabetic letters A, L, T and Y to have a broad end corresponding to the bottom of A or L or the top of T or Y and a narrow end corresponding to the top of A or L or the bottom of T or Y, the lower arm being pivotably connected with the knuckle lower portion at the broad end thereof via pivot means including bearing portions provided at opposite edges of the broad end, and with the second vehicle body portion at the narrow end thereof via flexible bush means;

a strut bar mounted between a middle portion of the knuckle and an opposing third portion of the vehicle body to extend substantially in the longitudinal direction of the vehicle, the strut bar being pivotably connected with the knuckle middle portion at a first end thereof via flexible bush means, and with the third vehicle body portion at a second end thereof opposite to the first end thereof via flexible bush means;

steering means mounted between the carrier and the vehicle body to variably determine an angular position of the carrier about the steering axis relative to the vehicle body; and vertical load reaction means mounted between the knuckle and the vehicle body to extend substantially vertically, the load reaction means including spring means and damper means.

In the above modeling of the general plan shape of the upper and lower arms to some alphabetic letters, it will be noted that the shape to be modeled as letter A may include such a modification that the bar is shifted almost to the bottom so as to give a shape of a triangle, wherein the arm may include a triangular plate portion or a triangular annular frame portion, while the shape to be modeled as letter Y may include such a modification that the lower leg portion is so substantially shortened that the shape may be deemed as letter V. The essential with regard to the plan shape of the arms is in that the arm has a firm integral construction having a first broad end and a second narrow end opposite to the first broad end.

The independent steering suspension according to the abovementioned construction will be constructed to have a desirable balance between rigidity and weight when the upper arm has the L plan configuration, and the lower arm has the A plan configuration.

BRIEF DESCRIPTION OF THE DRAWING

In the accompanying drawings.

DESCRIPTION OF THE EMBODIMENTS

Figure 1:
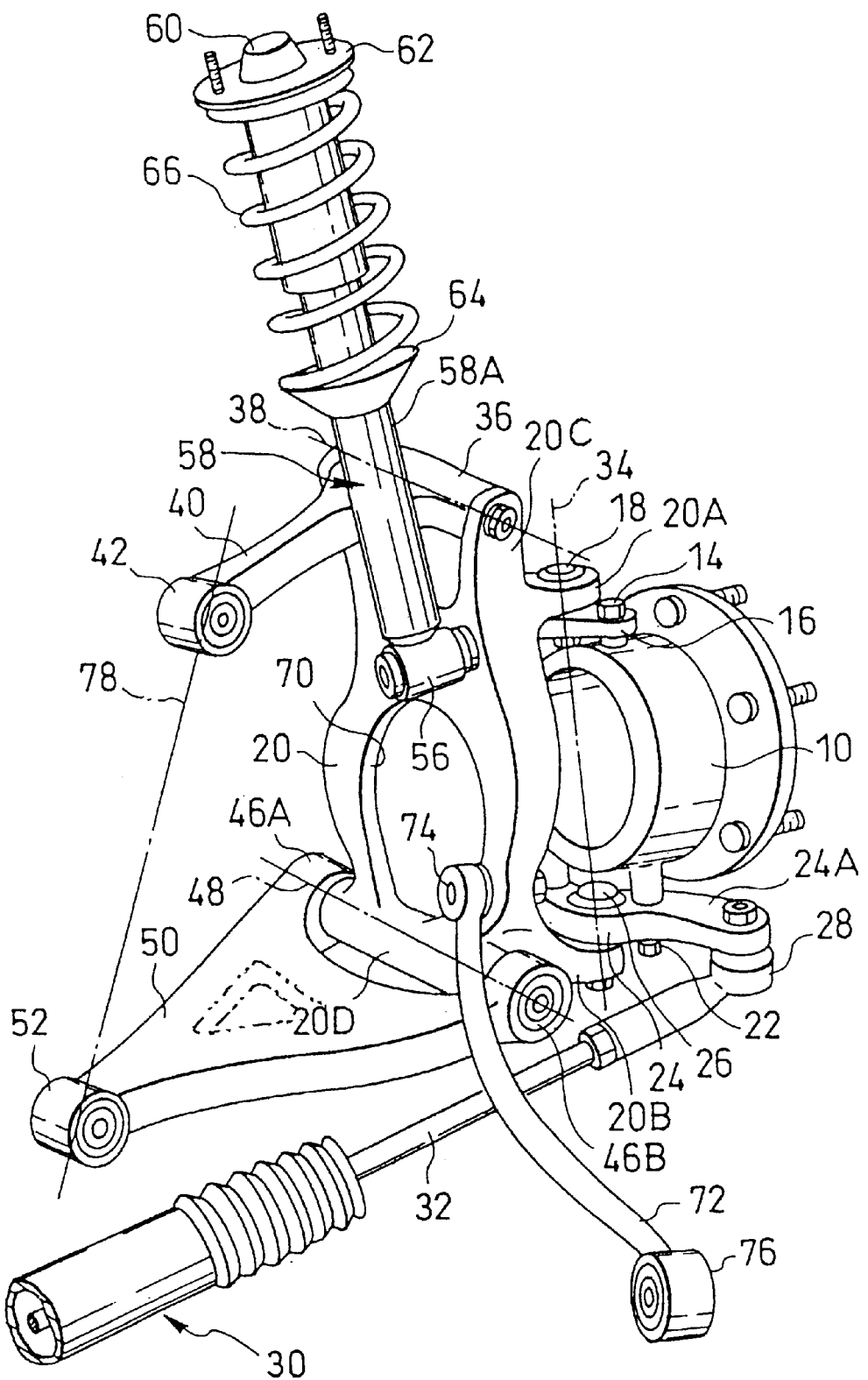
FIG. 1 is a perspective view showing a preferred embodiment of the present invention.
Figure 2:
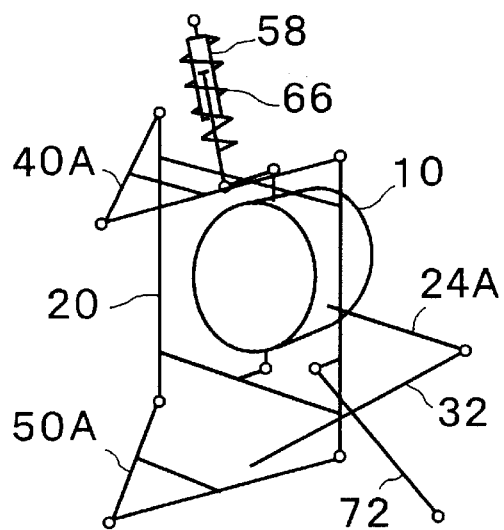
FIGS. 2–5 are diagrammatical perspective views showing examples of construction of the upper and lower arms according to the present invention.
Figure 3:
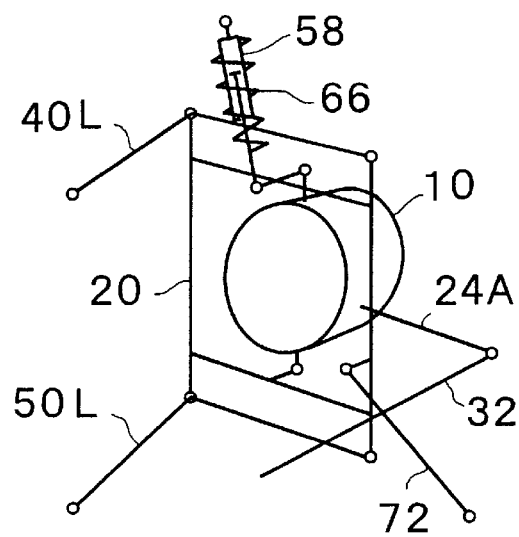
Figure 4:
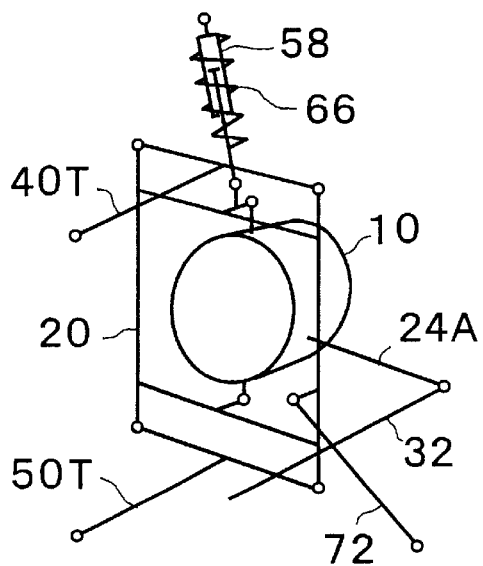
Figure 5:
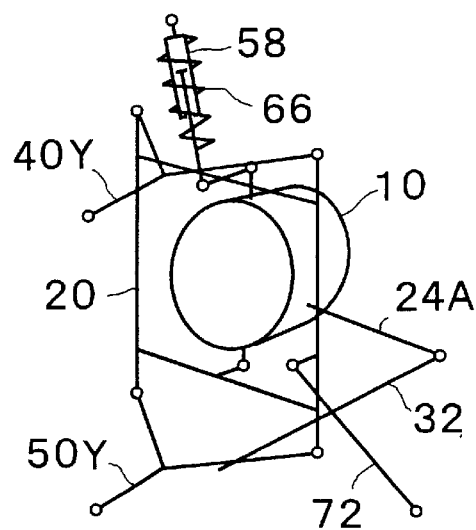

Referring to FIG. 1, the present invention will be described in detail with respect to most preferred embodiment thereof. In the figure, 10 is a carrier for supporting a steering vehicle wheel (not shown) via a bearing means (not shown) to be rotatable about a rotation axis thereof. The carrier 10 is provided with a connection member 16 at a diametrically upper portion thereof fixed thereto by a bolt 14 and a connection member 24 at a diametrically lower portion thereof fixed thereto by a bolt 22. The upper connection member 16 is pivotably connected with an upper lug portion 20A of a knuckle 20 via a ball joint 18, while the lower connection member 24 is pivotably connected with a lower lug portion 20B of the knuckle 20 via a ball joint 26, so that the carrier 10 is rotatable relative to the knuckle 20 about a steering axis 34 connecting centers of the ball joints 18 and 26.

The connection member 24 includes a knuckle arm 24A formed as an integral part thereof, a tip end of which is pivotably connected with an end of a tie rod 32 of a steering means 30 via a ball joint 28. Thus, the axis 34 defines the so-called king pin axis around which the carrier 10 is turned for a steering of the vehicle wheel by the steering means 30.

As well known in the art, when the vehicle wheel is at its neutral position, the king pin axis 34 is, as viewed from the inboard side of the suspension, inclined relative to verticality so as to shift forward relative to the vehicle (rightward in the figure) and downward while traversing the rotation axis of the vehicle wheel.

The knuckle 20 has a pair of brackets 20C at an upper portion thereof at which the knuckle is pivotably connected with an outboard end of an upper arm 40 via a joint 36 including a rubber bush, so as to allow a pivoting movement therebetween about an axis 38 extending substantially in the longitudinal orientation of the vehicle.

In the shown embodiment, the upper arm 40 is formed as an L-type arm having a general plan configuration of alphabetic letter L as viewed from the top thereof, having a broad end corresponding to the bottom of L and a narrow end corresponding to the top of L. It is the broad end of the L-type arm 40 that is pivotably connected with the knuckle via the joint 36.

The narrow end of the L-type arm 40 is located at the inboard side of the suspension and pivotably connected with the body of the vehicle (not shown) via a joint 42 including a rubber bush having a pivot axis extending substantially in the longitudinal orientation of the vehicle body.

The knuckle 20 is provided with a cylindrical portion 20D at a lower end thereof at which the knuckle is pivotably connected with a pair of outboard ends of a lower arm 50 via a pair of joints 46A and 46B each including a rubber bush so as to be relatively pivotable about a pivot axis 48 extending substantially in the longitudinal orientation of the vehicle. The lower arm 50 is an A-type arm having a general plan configuration of alphabetic letter A, having a broad end corresponding to the bottom of A and a narrow end corresponding to the top of A. The arm 50 may be formed with a triangular opening shown by a phantom line to save the material and the weight thereof without substantially decreasing the strength thereof, thereby becoming more like A. It is the broad end of the A-type arm 50 that is pivotably connected with the knuckle via the joints 46A and 46B. The narrow end of the A-type arm 50 is located at the inboard side of the broad end thereof and pivotably connected with the vehicle body (not shown) by a joint 52 including a rubber bush having a pivot axis extending substantially in the longitudinal orientation of the vehicle body.

A shock absorber 58 is provided as pivotably connected at a lower end thereof with the knuckle 20 via a joint 56 including a rubber bush, and pivotably connected at an upper end thereof with the vehicle body (not shown) via a joint 60 including a rubber bush. An upper seat member 62 is mounted at the upper end of the shock absorber provided by a cylinder member thereof, while a lower seat member 64 is mounted to a middle portion of the shock absorber provided by a piston member 58A thereof, and a compression coil spring 66 working as a suspension spring is mounted between the upper and lower seat members 62 and 64. The knuckle 20 is formed with an opening 70 for receiving a drive shaft (not shown) of the vehicle wheel (not shown).

A strut bar 72 is provided as pivotably connected at a forward end thereof with the knuckle 20 at a middle portion thereof rearward of the opening 70 via a ball joint 74, the strut bar 72 extending therefrom rearward and inboard to a rear end 76 thereof where it is pivotably connected with the vehicle body (not shown) via a pivot joint including a rubber bush.

As will be appreciated from the constructions described above and shown in FIG. 1, the assembly illustrated therein exhibits good rigidity while providing good rebound movement. The assembly is made of the knuckle 20, the upper arm 40 pivotably connected with the knuckle at the upper portion thereof with the broad end thereof via the pivot joint 36 having the bearing portion extending over the entire breadth of the broad end and the lower arm 50 pivotably connected with the knuckle at the lower end thereof with the broad end thereof via the pivot joints 46A and 46B provided at the opposite edges of the broad end. This assembly will exhibit a high rigidity against a twisting relative to an axis 78 connecting centers of the pivot joints 42 and 52 at the inboard ends of the upper and lower arms 40 and 50 while allowing a light bounding and rebounding movement of the carrier 10 relative to the vehicle body. Additionally, the assembly provides a unform turn of the knuckle 20 about the axis 78 within a range afforded by the resiliency of the bush means incorporated in the pivot joints 42 and 52 of the singular inboard ends 42 and 52 of the arms 40 and 50 so that any desired longitudinal compliance of the suspension is available according to an adjustment of a longitudinal resiliency of the strut bar 72. The resiliency of the bush means incorporated in the pivot joint of the end 76 may be adjusted without disturbing the caster angle of the carrier 10 which is optionally determined substantially by the design inclination of the steering axis 34.

Further, as will be also appreciated from the constructions shown in FIG. 1, when the upper arm 40 is constructed as an L-type arm, the abovementioned twist-firm assembly of the knuckle and the upper and lower arms is available in a simple and compact construction by readily avoiding interference between the upper arm 40 and the shock absorber 58. In order to optimize the ratio of the anti-twist rigidity of the assembly to the weight thereof, it would be generally most desirable that the lower arm is made as an A-type arm as in the embodiment shown in FIG. 1, since there is no problem of interference with the shock absorber with respect to the lower arm.

However, the independent steering suspension according to the present invention may be constructed by employing any combination of the A, L, T and Y-type arms for the upper and lower arms according to the convenience due to other conditions. FIGS. 2–5 show diagrammatically how it is constructed by employing each of the A, L, T and Y-type arms for the upper and lower arms. In these embodiments, for the convenience of exemplification, each embodiment is constructed by employing the same type of arms both for the upper and the lower arms. However, the upper and lower arms may of course be constructed by different types of arms, as in the embodiment shown in FIG. 1. In FIGS. 2–5, the portions corresponding to those shown in FIG. 1 are designated by the same reference numerals as in FIG. 1, except the upper and lower arms which are shown by 40 and 50 accompanied by the alphabetic character corresponding to the type, respectively. As will be noted, when a T-type arm is used for the upper arm, the mounting position of the shock absorber 58 to the knuckle 20 needs a modification to avoid interference with the upper arm. Further descriptions with respect to the embodiments of FIGS. 2–5 will be omitted to avoid redundancy of the specification.

Although the present invention has been described in detail with respect to a preferred embodiment thereof and its modifications in diagrammatical illustrations, it will be apparent for those skilled in the art that various modifications are possible with respect to the shown embodiments without departing from the scope of the invention.

We claim:

1. An independent steering suspension for a steering vehicle wheel of a vehicle having a vehicle body and vehicle wheels including said steering vehicle wheel, the vehicle body having a longitudinal orientation thereof in a direction of running thereof and a lateral orientation thereof perpendicular to said longitudinal orientation as viewed from a top of the vehicle, comprising:

a carrier for supporting said steering vehicle wheel to be rotatable about a rotation axis thereof;

a knuckle for supporting said carrier to be angularly movable relative thereto about a steering axis extending substantially vertically;

an upper arm mounted between an upper portion of said knuckle and an opposing first portion of the vehicle body to extend substantially in the lateral orientation of the vehicle body, said upper arm having a general plan configuration selected from alphabetic letters A, L, T and Y to have a broad end corresponding to the bottom of A or L or the top of T or Y and a narrow end corresponding to the top of A or L or the bottom of T or Y, said upper arm being pivotally connected with said knuckle upper portion at said broad end thereof via at least one pivot joint including bearing portions provided at opposite edges of said broad end, and flexibly connected with said first vehicle body portion at said narrow end thereof via a first flexible joint;

a lower arm mounted between a lower portion of said knuckle and an opposing second portion of the vehicle body to extend substantially in the lateral orientation of the vehicle body, said lower arm having a general plan configuration selected from alphabetic letters A, L, T and Y to have a broad end corresponding to the bottom of A or L or the top of T or Y and a narrow end corresponding to the top of A or L or the bottom of T or Y, said lower arm being pivotably connected with said knuckle lower portion at said broad end thereof via at least one pivot joint including bearing portions provided at opposite edges of said broad end, and flexibly connected with said second vehicle body portion at said narrow end thereof via a second flexible joint;

a strut bar mounted between a middle portion of said knuckle and an opposing third portion of the vehicle body to extend substantially in the longitudinal orientation of the vehicle, said strut bar being flexibly connected with said knuckle middle portion at a first end of the strut bar via a third flexible joint and flexibly connected with said third vehicle body portion at a second end of the strut bar opposite to said first end via a fourth flexible joint;

steering means mounted between said carrier and the vehicle body to variably determine an angular position of said carrier about said steering axis relative to the vehicle body; and vertical load reaction means mounted between said knuckle and the vehicle body to extend substantially vertically, said load reaction means including a spring and a damper.

2. An independent steering suspension according to claim 1, wherein said upper arm has the L plan configuration, and said lower arm has the A plan configuration.

3. An independent steering suspension for a steering vehicle wheel of a vehicle having a vehicle body and vehicle wheels including said steering vehicle wheel, the vehicle body having a longitudinal orientation thereof in a direction of running thereof and a lateral orientation thereof perpendicular to said longitudinal orientation as viewed from a top of the vehicle, comprising:

a carrier for supporting said steering vehicle wheel rotatable about a rotation axis of the carrier;

a knuckle for supporting said carrier, said carrier angularly movable about a steering axis extending substantially vertically;

an upper arm mounted between an upper portion of said knuckle and an opposing first portion of the vehicle body to extend substantially in the lateral orientation of the vehicle body, said upper arm having a broad end and a narrow end, said upper arm being pivotablly connected with said knuckle upper portion at said broad end of the upper arm via at least one first pivot joint including bearing portions provided at opposite edges of said broad end, and flexibly connected with said first vehicle body portion at said narrow end thereof via a first flexible joint;

a lower arm mounted between a lower portion of said knuckle and an opposing second portion of the vehicle body to extend substantially in the lateral orientation of the vehicle body, said lower arm having a broad end and a narrow end, said lower arm being pivotally connected with said knuckle lower portion at said broad end of the lower arm via at least one second pivot joint including bearing portions provided at opposite edges of said broad end, and flexibly connected with said second vehicle body portion at said narrow end thereof via a second flexible joint;

a strut bar mounted between a middle portion of said knuckle and an opposing third portion of the vehicle body to extend substantially in the longitudinal orientation of the vehicle, said strut bar being flexibly connected with said knuckle middle portion at a first end of the strut bar via a third flexible joint and flexibly connected with said third vehicle body portion at a second end of the strut bar opposite to said first end via a fourth flexible joint.

4. An independent steering suspension according to claim 3, wherein said first, second and fourth fourth flexible joints are each a flexible bush joint.

5. An independent steering suspension according to claim 3, wherein the upper arm has an L plan configuration, and the lower arm has an A plan configuration.

6. An independent steering suspension for a steering vehicle wheel of a vehicle having a vehicle body and vehicle wheels including said steering vehicle wheel, the vehicle body having a longitudinal orientation thereof in a direction of running thereof and a lateral orientation thereof perpendicular to said longitudinal orientation as viewed from a top of the vehicle, comprising:

a carrier for supporting the steering vehicle wheel rotatable about a rotation axis of the carrier;

a knuckle for supporting the carrier, the carrier angularly movable about a steering axis extending substantially vertically;

an upper arm mounted between the knuckle and the vehicle body, the upper arm having a broad end pivotally connected to the knuckle and a narrow end flexibly connected to a vehicle body;

a lower arm mounted between the knuckle and the vehicle body, the lower arm having a broad end pivotally connected to the knuckle and a narrow end flexibly connected to the vehicle body; and a strut bar flexibly connected to the knuckle and the vehicle body.

7. An independent steering suspension according to claim 6, wherein the knuckle comprises an upper, lower and middle portion and the vehicle body comprises a first, second and third portion;

the upper arm being mounted between the knuckle upper portion and the first vehicle body portion, the upper arm being pivotally connected with the upper knuckle portion at the broad end of the upper arm via at least one first pivot joint and flexibly connected with the first vehicle body portion at the narrow end via a first flexible joint;

the lower arm being mounted between the knuckle lower portion and the second vehicle body portion, the lower arm being pivotally connected with the knuckle lower portion at the broad end of the lower arm via at least one second pivot joint and flexibly connected with the second vehicle body portion at the narrow end via a second flexible joint; and the strut bar being mounted between the middle portion of the knuckle and the third vehicle body portion, the strut bar being flexibly connected with the knuckle middle portion at a first end of the strut bar via a third flexible joint and flexibly connected with said third vehicle body portion at a second end of the structure opposite to said first end via a fourth flexible joint.

8. An independent steering suspension according to claim 7, wherein said upper arm has an L plan configuration, and said lower arm has an A plan configuration.

9. An independent steering suspension according to claim 7, wherein the first and second pivot joints include bearing portions provided at opposite edges of said broad ends.

* * * * *